United States Patent
Wang et al.

(10) Patent No.: US 11,854,165 B2
(45) Date of Patent: Dec. 26, 2023

(54) DEBANDING USING A NOVEL BANDING METRIC

(71) Applicant: Google LLC, Mountain View, CA (US)

(72) Inventors: Yilin Wang, Sunnyvale, CA (US); Balineedu Adsumilli, Sunnyvale, CA (US); Feng Yang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 81 days.

(21) Appl. No.: 17/922,531

(22) PCT Filed: May 19, 2020

(86) PCT No.: PCT/US2020/033545
§ 371 (c)(1),
(2) Date: Oct. 31, 2022

(87) PCT Pub. No.: WO2021/236061
PCT Pub. Date: Nov. 25, 2021

(65) Prior Publication Data
US 2023/0131228 A1    Apr. 27, 2023

(51) Int. Cl.
*G06T 5/00*    (2006.01)
*G06T 5/20*    (2006.01)
(Continued)

(52) U.S. Cl.
CPC ............ *G06T 5/002* (2013.01); *G06T 5/20* (2013.01); *G06T 7/13* (2017.01); *G06V 10/56* (2022.01);
(Continued)

(58) Field of Classification Search
CPC .. G06T 5/002; G06T 5/20; G06T 7/13; G06T 2207/20081; G06V 10/56; G06V 10/761
See application file for complete search history.

(56) References Cited

U.S. PATENT DOCUMENTS 11,259,040 B1 *    2/2022    Sabui .................... H04N 19/46
11,508,053 B2 *    11/2022    Morzos ................ G06T 7/0002
(Continued)

FOREIGN PATENT DOCUMENTS

JP    2018-045401 A    3/2018

OTHER PUBLICATIONS

Y. Wang, S.-U. Kum, C. Chen and A. Kokaram, "A perceptual visibility metric for banding artifacts," 2016 IEEE International Conference on Image Processing (ICIP), Phoenix, AZ, USA, 2016, pp. 2067-2071, doi: 10.1109/ICIP.2016.7532722. (Year: 2016).*

(Continued)

*Primary Examiner* — Andrae S Allison
(74) *Attorney, Agent, or Firm* — Young Basile Hanlon & MacFarlane, P.C.

(57) ABSTRACT

A method includes training a first model to measure the banding artefacts, training a second model to deband the image, and generating a debanded image for the image using the second model. Training the first model can include selecting a first set of first training images, generating a banding edge map for a first training image, where the map includes weights that emphasize banding edges and de-emphasize true edges in the first training image, and using the map and a luminance plane of the first training image as input to the first model. Training the second model can include selecting a second set of second training images, generating a debanded training image for a second training image, generating a banding score for the debanded training image using the first model, and using the banding score in a loss function used in training the second model.

20 Claims, 13 Drawing Sheets

(51) Int. Cl.
G06V 10/56 (2022.01)
G06V 10/74 (2022.01)
G06T 7/13 (2017.01)

(52) U.S. Cl.
CPC .. G06V 10/761 (2022.01); *G06T 2207/20081* (2013.01)

(56) References Cited

U.S. PATENT DOCUMENTS

| | | | |
|---|---|---|---|
| 2011/0116726 A1* | 5/2011 | Hosaka | G06T 5/003 382/255 |
| 2014/0146881 A1* | 5/2014 | Kim | H04N 19/86 375/240.03 |
| 2016/0098822 A1* | 4/2016 | Nicolas | G06T 5/002 382/275 |
| 2017/0053176 A1* | 2/2017 | Yang | G06T 5/20 |
| 2017/0347126 A1 | 11/2017 | Shoa Hassani Lashdan | |
| 2019/0285713 A1* | 9/2019 | Polak | G06N 20/00 |
| 2022/0038749 A1* | 2/2022 | Shang | G06N 20/00 |
| 2022/0148146 A1* | 5/2022 | Morzos | G06T 7/0002 |

OTHER PUBLICATIONS

Zhou, Raymond, et al. "Deep Image Debanding." 2022 IEEE International Conference on Image Processing (ICIP). IEEE, 2022. (Year: 2022).*

International Search Report and Written Opinion of International Application No. PCT/US2020/033545, dated Feb. 16, 2020, 2020, 17 pgs.

Changmeng Peng et al., "CNN-based bit-depth enhancement by the suppression of false contour and color distortion", Proceedings of APSIPA Annual Summit and Conference, Nov. 18-21, 2019, Lanzhou, China, pp. 1145-1151.

Zhengzhong Tu et al., "BBAND Index: A No-Reference Banding Artifact PREDICTOR",2020 IEEE International Conferen ce on Acoustics, Speech and Signal Processing (ICASSP), May 4, 2020, pp. 2712-2716.

Yilin Wang et al., "A perceptual visibility metric for banding artifacts", IEEE International Conference on Image Processing (ICIP) 2016, 5 pgs.

Ji Won Lee et al., "Two-Stage False Contour Detection Using Directional Contrast Features and Its Application to Adaptive False Contour Reduction", IEEE Transactions on Consumer Electronics, vol. 52, No. 1, Feb. 2006, pp. 179-188.

Gary Baugh et al., "Advanced Video Debanding", European Conference on Visual Media & Production (CVMP), London, UK, Nov. 13-14, 2014, 10 pgs.

Wang et al., "GIF2Video: Color Dequantization and Temporal Interpolation of GIF images", 2019, 10 pgs.

* cited by examiner

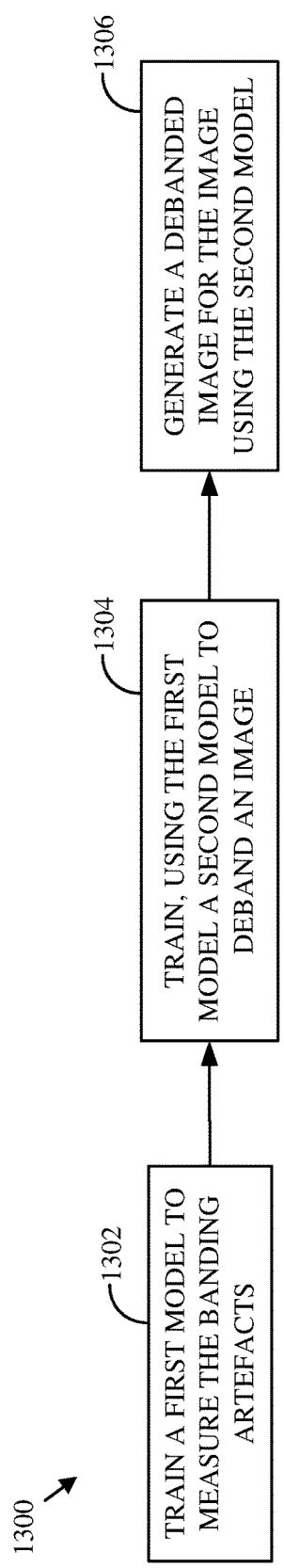

DEBANDING USING A NOVEL BANDING METRIC

BACKGROUND

Image content (e.g., of still images or frames of video) represents a significant amount of online content. For example, a web page may include multiple images, and a large portion of the time and resources spent rendering the web page are dedicated to rendering those images for display. The amount of time and resources required to receive and render an image for display depends in part on the manner in which the image is compressed. As such, an image can be rendered faster by reducing the total data size of the image using lossy compression and decompression techniques.

Lossy compression techniques seek to represent image content using fewer bits than the number of bits in the original image. Lossy compression techniques can introduce visual artefacts, such as ringing artefacts and banding artefacts, into the decompressed image. Higher compression levels can result in more observable artefacts. It is desirable to detect (e.g., measure, etc.) such artefacts (e.g., banding artefacts) so that they can be eliminated (or at least reduced).

SUMMARY

A first aspect is a method of removing banding artefacts from an image. The method includes training a first model to measure the banding artefacts; training a second model to deband the image; and generating a debanded image for the image using the second model. Training the first model includes selecting a first set of first training images to train the first model; for a first training image of the first set of the first training images, generating a banding edge map, where the banding edge map includes weights that emphasize banding edges and de-emphasize true edges in the first training image; and using the banding edge map and a luminance plane of the first training image as input to the first model. Training the second model includes selecting a second set of second training images to train the second model; for a second training image of the second set of the second training images, generating a debanded training image; generating, using the first model, a banding score for the debanded training image; and using the banding score in a loss function that is used in training the second model.

A second aspect is an apparatus for debanding an image. The apparatus includes a memory and a processor. The processor is configured to execute a second model that receives the image as an input and outputs a debanded image for the image. The second model is trained by steps to select a second set of second training images; for a second training image of the second training images, generate a training debanded image; generate a banding score for the training debanded image; generate an image difference between the second training image and the training debanded image; and use a weighted combination of the image difference and the banding score in a loss function that is used to train the second model.

A third aspect is an apparatus for measuring a banding score of an image. The apparatus includes a first model that is configured to receive the image as an input; and output the banding score for the image. The first model is trained by steps to select a first set of first training images to train the first model; for a first training image of the first set of the first training images, generate a banding edge map, where the banding edge map includes weights that emphasize banding edges and de-emphasize true edges in the first training image; and use the banding edge map and a luminance plane of the first training image as input to the first model.

A fourth aspect is a method of training a model to deband an image, comprising: for a training image of a second set of second training images: receiving a training debanded image, the training debanded image comprising image data obtained by removing banding artefacts from the training image; generating a banding score for the training debanded image; generating an image difference between the second training image and the training debanded image; and using a weighted combination of the image difference and the banding score in a loss function that is used to train the second model.

The second set of second training images may comprise a plurality of training images and the method may comprise repeating the processing for each second training image of the second set. The method may further comprise: receiving an image comprising banding artefacts; and processing the image using the model to remove the banding artefacts. Generating the banding score for the training debanded image may comprise processing the training debanded image using a first model to generate the banding score, wherein the first model is trained by, for a first training image of a first set of first training images: generating a banding edge map from the first training image, wherein the banding edge map indicating edges caused by banding artefacts in the first training image; and using the banding edge map and a luminance plane of the first training image as input to the first model. The banding edge map may comprise weights for each of a plurality of locations of the first training image, the weights emphasizing banding edges and de-emphasizing true edges in the first training image. Generating the banding edge map may comprise: computing a gradient map for a luminance channel of the first training image; computing a weight map for the first training image and obtaining the banding edge map by multiplying the gradient map by the weight map. The weight map may comprise respective weights for pixels of the first training image. The weight map may be computed using the gradient map. Computing the weight map for the first training image may comprise: generating a map using the gradient map, wherein the map excludes high contrast pixels; and convolving, to obtain the weight map, the map with a kernel having a predefined size. The predefined size may be equal to 7×7. The kernel may consist of 1 values.

A fifth aspect is a method of training a model to remove banding artefacts from an image, comprising: training a first model to measure the banding artefacts, wherein training the first model comprises: for a training image of a first set of first training images: generating a banding edge map from the training image, wherein the banding edge map indicates edges caused by banding artefacts in the training image; and using the banding edge map and a luminance plane of the training image as training input to the first model; training a second model to deband the image, wherein training the second model comprises, for a second training image of a second set of second training images: receiving a debanded training image, the debanded training image comprising image data obtained by removing banding artefacts from the training image; generating, using the first model, a banding score for the debanded training image; using the banding score in a loss function that is used in training the second model; and outputting the trained second model.

The first set of first training images may comprise a plurality of training images and the method may comprise repeating the processing for each first training image of the first set. The method may further comprise: receiving an image comprising banding artefacts; and processing the image using the trained second model to remove the banding artefacts.

Training the second model to deband the image may comprise: obtaining an image difference between the debanded training image and the second training image; and using the image difference in the loss function that is used in training the second model. The loss function may be a weighted sum of the image difference and the banding score. Generating the banding edge map may comprise: computing a gradient map for a luminance channel of the first training image; computing a weight map for the first training image; and obtaining the banding edge map by multiplying the gradient map by the weight map. The weight map may comprise respective weights for pixels of the first training image. The weight map may be computed using the gradient map. Computing the weight map for the first training image may comprise: generating a map using the gradient map, wherein the map excludes high contrast pixels; and convolving, to obtain the weight map, the map with a kernel having a predefined size. The predefined size may be equal to 7×7. The kernel may consist of 1 values.

A sixth aspect is a method of training a first model to measure a banding score of an image, comprising: for a first training image of a first set of first training images: generating a banding edge map, wherein the banding edge map indicates edges caused by banding artefacts in the training image; and using the banding edge map and a luminance plane of the first training image as training input to the first model.

The first set of first training images may comprise a plurality of training images and the method may comprise repeating the processing for each first training image of the first set. The method may further comprise: receiving an image as an input; and processing the image using the first model to generate a banding score for the image. Generating the banding edge map may comprise: computing a gradient map for the luminance plane of the first training image; computing a weight map for the first training image; and obtaining the banding edge map by multiplying the gradient map by the weight map. The weight map may comprise respective weights for pixels of the first training image. The weight map may be computed using the gradient map. Computing the weight map for the first training image may comprise: generating a map using the gradient map to exclude high contrast pixels; and convolving, to obtain the weight map, the map with a kernel having a predefined size. The predefined size may be equal to 7×7. The kernel may consist of 1 values. The first model may be used to train a second model, wherein the second model receives a banded image as an input and outputs a debanded image. The second model may be trained by steps to: select a second set of training images; for a second training image of the second training images, generate a training debanded image; generate, using the first model, a training banding score for the training debanded image; generate an image difference between the second training image and the debanded image; and use a weighted combination of the image difference and the training banding score in a loss function that is used to train the second model. The loss function may be a sum of a second norm of the image difference plus a weight multiplied by a second norm of the training banding score.

The first model may be a scoring model for generating a banding score for an image. The first training images may be scoring images for training the scoring model to generate a banding score. The second model may be a banding artefact removal model. The second training images may be banding artefact training images for training the banding artefact removal model to remove banding artefacts from images. The first model is sometimes referred to herein as a BandingNet and the second model is sometimes referred to herein as a DeBandingNet.

It will be appreciated that aspects can be implemented in any convenient form. For example, aspects may be implemented by appropriate computer programs that may be carried on appropriate carrier media, which may be tangible carrier media (e.g., disks) or intangible carrier media (e.g., communications signals). Aspects may also be implemented using suitable apparatus which may take the form of programmable computers running computer programs arranged to implement the methods. Aspects can be combined such that features described in the context of one aspect may be implemented in another aspect.

BRIEF DESCRIPTION OF THE DRAWINGS

FIG. 13 is a flowchart of an example of a technique for training a DeBandingNet using a BandingNet according to implementations of this disclosure.

FIG. 14 is a diagram that illustrates at least some aspects of the technique of FIG. 13.

DETAILED DESCRIPTION

Figure 1:
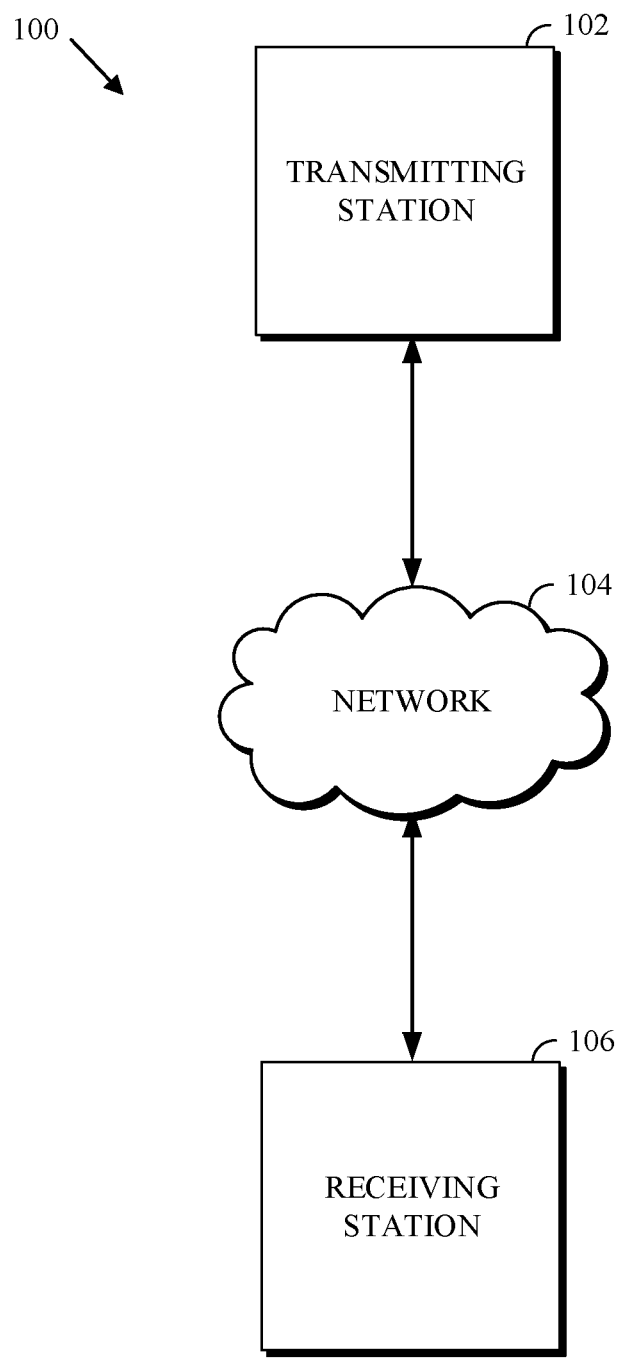
FIG. 1 is a diagram of a computing device in accordance with implementations of this disclosure.

Video compression schemes may include breaking each image (a single image or a frame of a video), into smaller portions, such as blocks, and generating an output bitstream using techniques to limit the information included for each block in the output. An encoded bitstream can be decoded to re-create the blocks and the source images from the limited information. In some implementations, the information included for each block in the output may be limited by reducing spatial redundancy, reducing temporal redundancy (in the case of video), or a combination thereof. For example, temporal (in the case of video frames) or spatial redundancies may be reduced by predicting a frame based on information available to both the encoder and decoder, and including information representing a difference, or residual, between the predicted frame and the original frame.

The residual information may be further compressed by transforming the residual information into transform coefficients. Transforming the residual information into transform coefficients can include a quantization step, which introduces loss—hence the name or term "lossy compression."

Lossy compression can be used to code visual information of an image. A lossy compression technique can be applied to a source image to produce a compressed image. The inverse of the lossy technique can be applied to the compressed image to produce a decompressed image. The lossy aspect of a lossy compression technique can be attributed, at least partially, to the quantizing of frequency domain information (as further described below). The amount of loss is dictated by a quantization step, which uses a quantization parameter (QP).

Another compression technique that can result in banding artefacts is what is referred to as palette mode (or palette-based coding). Palette-based coding can be used to code screen content, such as computer-generated video with substantial amount of text and graphics. Palette-based coding can result in decoded images that include artefacts, such as staircasing (or banding) artefacts. For example, source images may include local gradients that result from the point-spread-function of a capturing device, from anti-aliasing effects of the imaged structures, or from naturally and slowly developing image structures. For such images, palette-based coding may result in image artefacts, such as artificial staircasing, in the decoded (i.e., reconstructed) images. Such staircasing artefacts may also be referred to as banding artefacts.

An example of palette-based coding artefacts is now presented. Assume that an image is that of a glossy whiteboard upon which light sources are shined at different locations. As such, the image of the whiteboard may include small gradients and transition areas from white to light grey. Palette-based encoding the image may create banding effects, as described above. That is, for example, instead of gradual color changes, some bands (e.g., 16 bands) of grey may show in the decoded image where hard, artificial borders may form in the decoded image.

Figure 6:
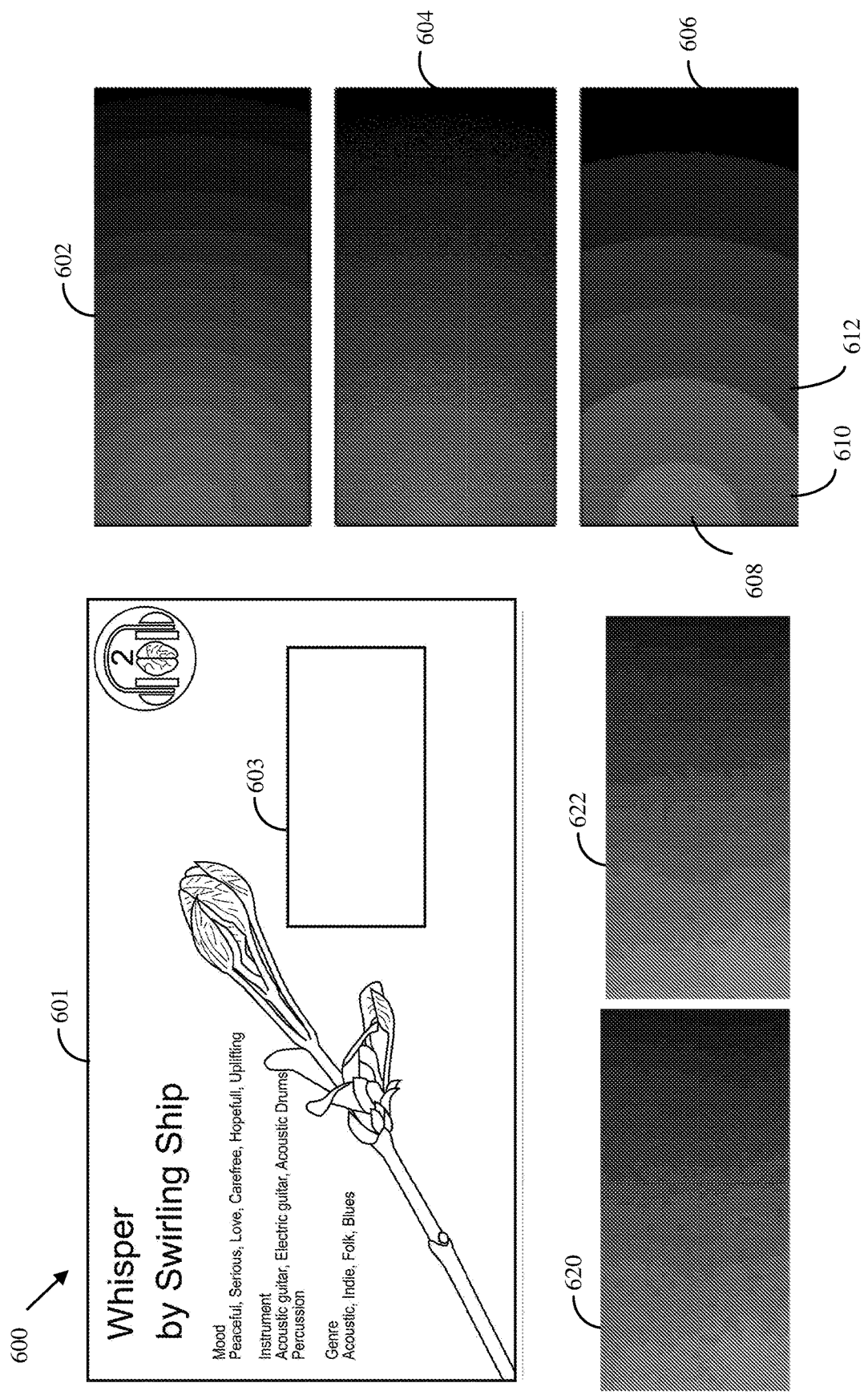
FIG. 6 is an illustration of an example of staircasing.

FIG. 6 is an illustration of an example 600 of staircasing (banding). In an example, the banding can be due to palette-based coding. The example 600 includes a source image 601 and a portion 603, which is shown as a zoomed region in a source image portion 602. The source image 601 and the portion 603 include many colors. However, for clarity of the image, the source image 601 and the portion 603 are shown in black and white. As such, the source image portion 602 can include several colors; however, the source image portion 602 is shown here in monochrome colors for reproduction reasons and clarity. The source image portion 602 illustrates smooth and gradual transitions between different shades of grey. A palette-based decoded representation 604 and a palette-based decoded representation 606 of the source image portion 602 illustrate staircasing effects. The staircasing effects can be more prominent, as shown in the palette-based decoded representation 606, when fewer colors are used in the palette used to encode and decode the source image portion 602. Whereas the source image portion 602 includes smooth color transitions, color bands (such as color bands 608, 610, 612) are formed in the palette-based decoded representation 606.

In an example scenario, the source image 601 may be a frame of a user-generated content (UGC) video. The video may be encoded and uploaded to (or uploaded and then encoded by) a content delivery service (e.g., YouTube). Image portion 620 may be part of the encoded and uploaded UGC video. Thus, the image portion 620 can be an encoded version of the source image portion 602.

The content delivery service may transcode a UGC video to accommodate different resolution, bitrate, aspect ratio, quality, network bandwidth, and/or like criteria. Further encoding an already encoded image that includes banding artefacts can further exacerbate the banding artefacts in at least some of the transcoded versions. For example, an image portion 622 is a transcoded and re-encoded version of the image portion 620.

Traditionally, debanding an image can be accomplished in two relatively independent steps. The first step detects where the banding artefacts are in an image; and the second step removes those artefacts. Complicated image processing techniques can be used to detect the banding artefacts. To remove the banding artefacts, some traditional techniques may blindly assign white noise across the entire image whether or not some regions of the image include banding artefacts.

Such traditional debanding techniques are undifferentiable. More specifically, the calculation of the debanding score is undifferentiable. For example, whereas a banding score of a debanded image (obtained using a traditional technique) may be obtained as a performance measure of the debanding step, the debanding score computation cannot be embedded in a neural network to compute the loss.

Techniques according to this disclosure can form a bridge between the steps of detecting and removing artefacts. The debanding techniques described herein (i.e., using machine learning to obtain a debanded image) can use banding information (e.g., a banding score) in the debanded image to more intelligently (e.g., such as by refining the debanding capability of the machine-learning model) assign noise to deband the image. Techniques according to this disclosure use a machine-learning (ML) model (i.e., referred to below as a BandingNet and the first model) that is trained to approximate the output of non-differential traditional debanding techniques. As such, and as becomes clearer from the explanations below, the debanding technique described herein (i.e., using what is referred below as a DeBandingNet and the second model) is differentiable.

Two machine-learning models (ML models or, simply, models) are described herein. The ML models can be convolutional neural networks (CNNs). A typical structure of a CNN is described with respect to FIG. 15. Each of the two learning models can be as described with respect to FIG. 15. For ease of reference, and to eliminate ambiguity, one of the machine-learning models is referred to herein as a BandingNet (and the first model) and the other machine-learning model is referred to as a DeBandingNet (and the second model).

In an example, the BandingNet computes (e.g., infers, outputs, etc.) a banding score for an input image, which may include banding artefacts. In an example, the BandingNet can output a classification of the input image, which can be mapped to a banding score. For simplicity of explanation, the BandingNet is simply said to output a banding score. The DeBandingNet outputs a debanded image given an input image that may include banding artefacts.

The BandingNet can be trained to output a banding score. After the BandingNet is trained, the BandingNet can be used in the training phase of the DeBandingNet. Banding scores output from the BandingNet can be used in a loss function that is used in the training of the DeBandingNet. After the DeBandingNet is trained, it can be used to generate debanded images of input images. For example, after training, the DeBandingNet can sufficiently distinguish between frames that include and those that don't include banding artefacts and adaptively apply debanding operations (e.g., dithering) based on the content of an input frame.

In another example, the trained BandingNet and DeBandingNet can be used together. For example, given an image, a banding score (or, equivalently, a banding classification) can be used to determine whether the image should be debanded via the DeBandingNet. For example, if the banding score of the image is greater than a threshold value, then the image can be input to the DeBandingNet for debanding; otherwise, the image is not input to the DeBandingNet.

Using the DeBandingNet, the UGC can be debanded prior to transcoding the UGC. In an example, all images (e.g., frames) of the UGC can simply be input to the DeBandingNet to generate respective debanded images. In another example, a frame is input to the DeBandingNet only if the banding score of the frame, which can be obtained using the BandingNet, exceeds a threshold (e.g., a threshold value or a threshold classification). This scenario is referred to below as debanding via pre-processing. The pre-processing scenario is described below with respect to FIG. 7A.

In another example, the UGC can be transcoded into one or more versions. A user device that receives one of the transcoded versions, can use the DeBandingNet to obtain debanded images of the UGC. Similar to the pre-processing scenario described above, in some implementations, an image can be input to the DeBandingNet only if the banding score of the image, which can be obtained via the BandingNet, exceeds a threshold, prior to displaying (or saving) the one version at the user device. This scenario is referred to below as debanding via post-processing. The post-processing scenario is described below with respect to FIG. 7B.

Details of debanding using the novel banding metric are described herein with initial reference to a system in which and/or in conjunction with which the teachings herein can be implemented.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
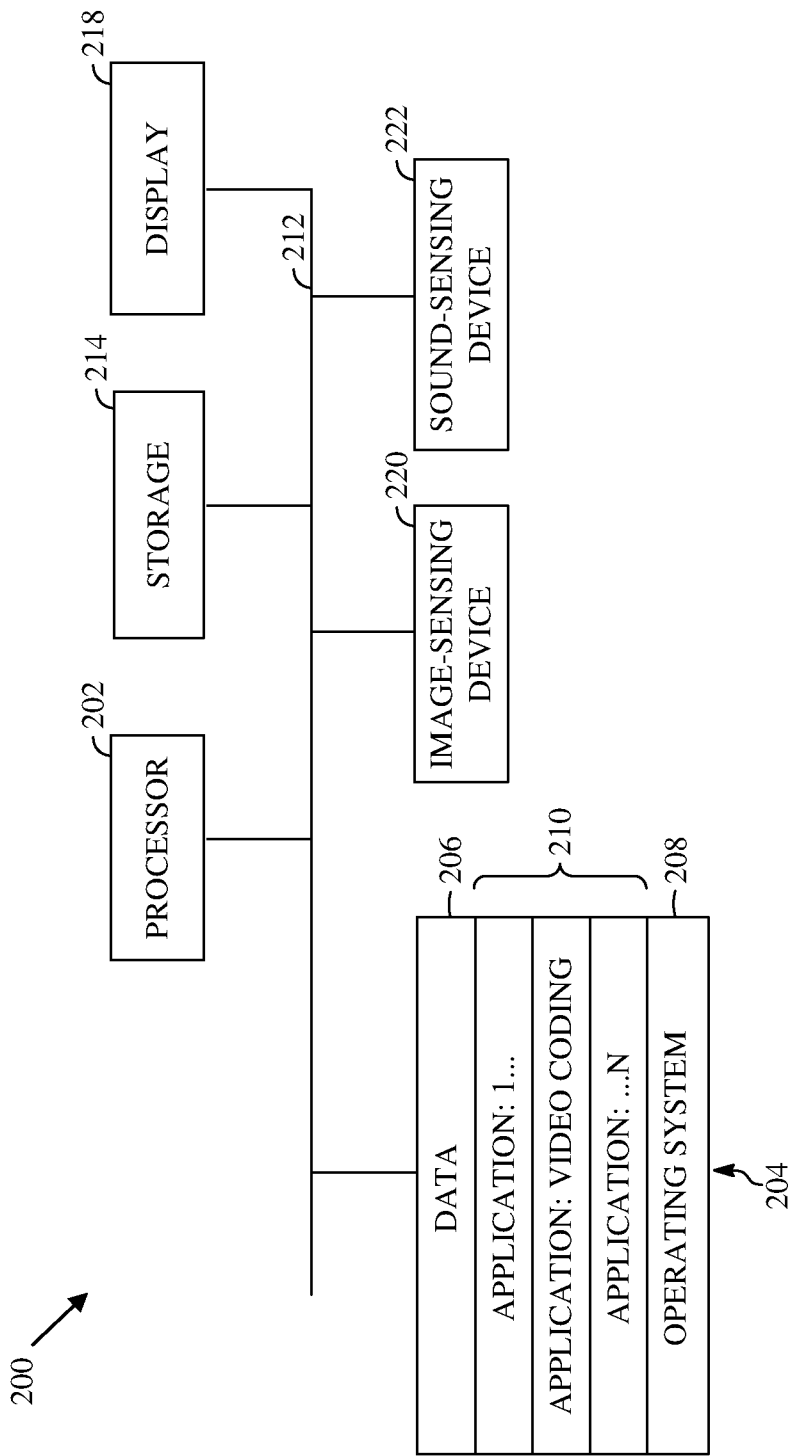
FIG. 2 is a diagram of a computing and communications system in accordance with implementations of this disclosure.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP, e.g., a Hyper-Text Transfer protocol (HTTP)-based video streaming protocol, may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform at least some of the techniques described herein. For example, the application programs 210 can include applications 1 through N, which further include one or more applications that perform at least some of the techniques described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
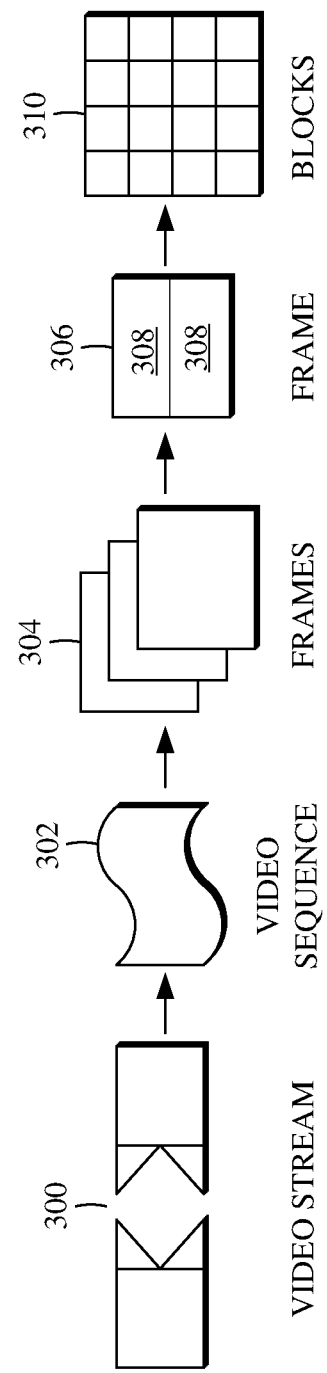
FIG. 3 is a diagram of a video stream for use in encoding and decoding in accordance with implementations of this disclosure.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
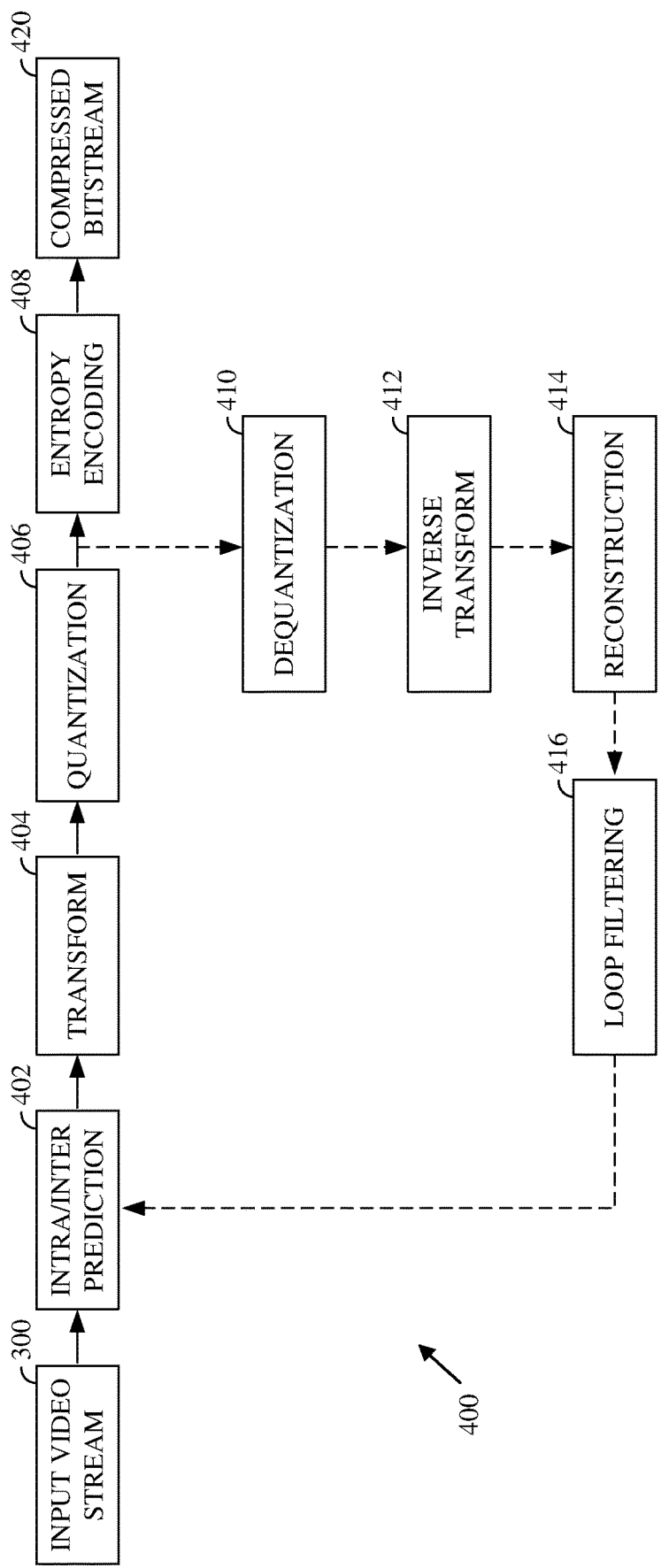
FIG. 4 is a block diagram of an encoder in accordance with implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artefacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
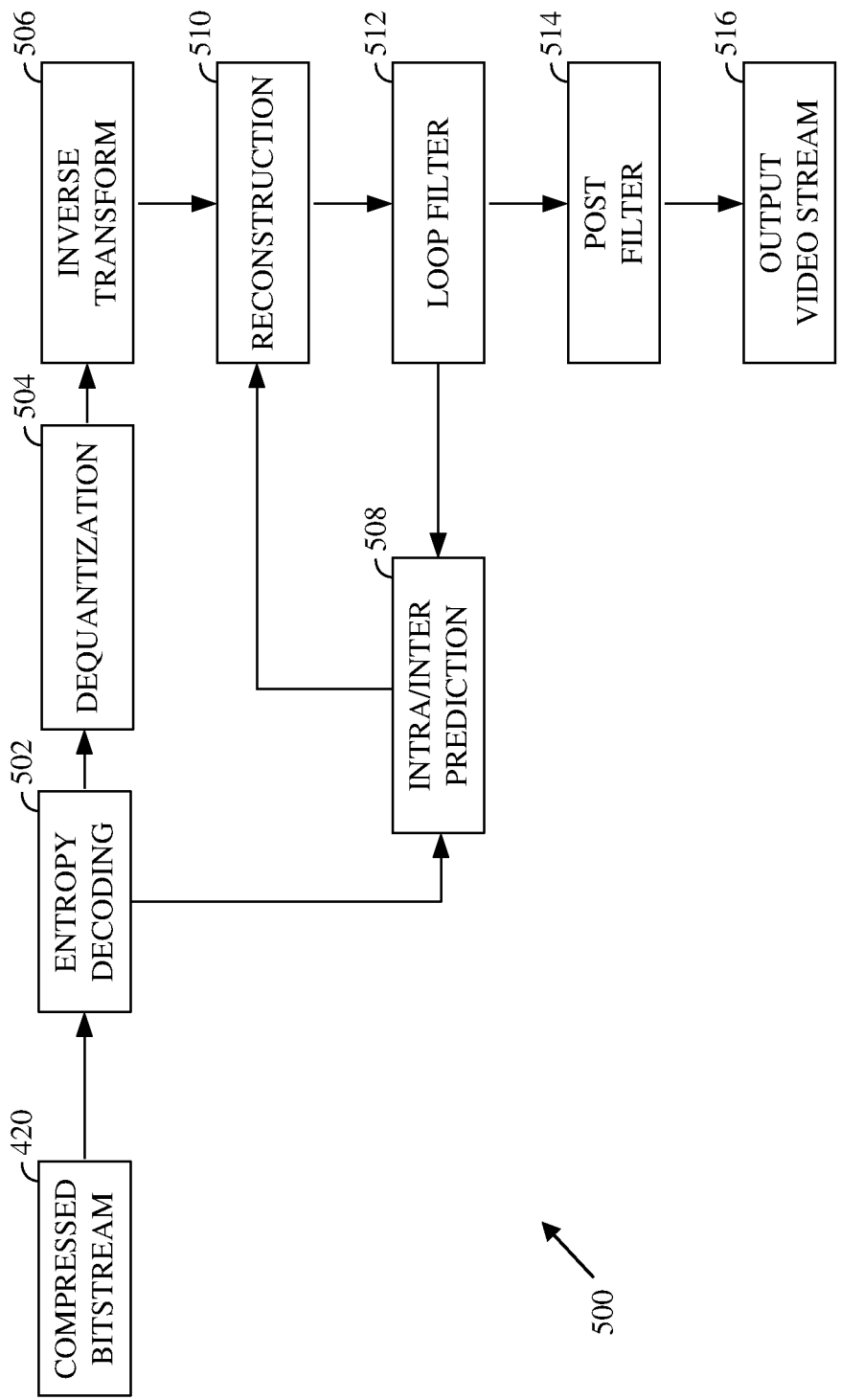
FIG. 5 is a block diagram of a decoder in accordance with implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artefacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

Figure 7A:
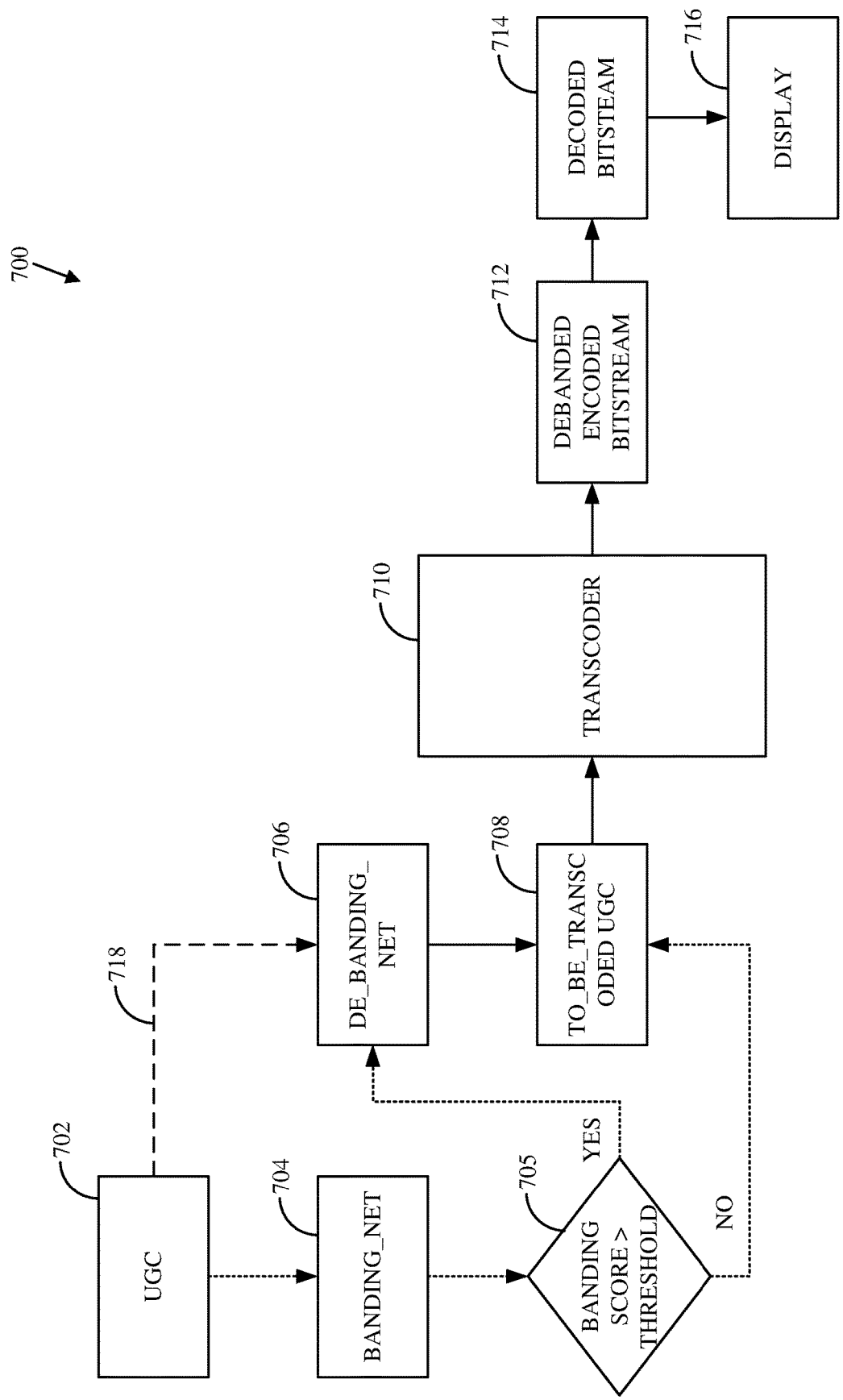
FIG. 7A is an example of using a trained debanding model in a pre-processing scenario according to implementations of this disclosure.

FIG. 7A is an example 700 of using a trained debanding model in a pre-processing scenario according to implementations of this disclosure. In the example 700, a DeBandingNet is used prior to transcoding a user-generated content (UGC). For example, an image or a frame of a UGC can be input through the DeBandingNet to produce a debanded UGC, which is then transcoded or re-encoded.

A UGC 702 may be received at a content delivery system. The content delivery system can receive UGC, transcode the UGC according to different parameters, and generate respective versions of the UGC.

In an example, the UGC 702 can be output by an encoder, such as the encoder 400 of FIG. 4. Thus, the UGC 702 can be the compressed bitstream 420 of FIG. 4. A BandingNet (i.e., a banding_net 704) can determine a banding score of an image of the UGC 702. More accurately, the banding_net 704 determines a banding index for a decoded version of the UGC 702. Thus, while not specifically shown in FIG. 7A, the UGC 702 can be decoded prior to being input to the banding_net 704. The UGC 702 can be decoded by a decoder, such as the decoder 500 of FIG. 5. Thus, the input to the banding_net 704 can be the output video stream 516 of FIG. 5.

At a test 705, if the banding score is greater than a threshold banding score, then UGC 702 can be input to a de_banding_net 706 (i.e., a trained DeBandingNet) to deband the image. The threshold banding score can be empirically selected such that below which banding artefacts in the image are not perceived by a human viewer. A to_be_transcoded 708 (i.e., a data item to be transcoded corresponding to the output of processing the UGC with the de_banding_net 706) can be obtained from the de_banding_net 706. On the other hand, if at the test 705, the banding score is not greater than the threshold banding score, then the UGC 702 is not input to the de_banding_net 706. In this case, the to_be_transcoded 708 is the UGC 702 itself.

The to_be_transcoded 708 can then be input to a transcoder 710, which outputs one or more versions of the to_be_transcoded 708, including a debanded and encoded bitstream 712. The debanded and encoded bitstream 712 can be received at a device, such as the receiving station 106 of FIG. 1 or a user that can be as described with respect to the computing device 200 of FIG. 2. The debanded and encoded bitstream 712 can be decoded at the device to obtain a decoded bitstream 714, which can be as described with respect to the output video stream 516 of FIG. 5. The output video stream 516 can then be displayed at a display 716 of the device. In another example, the debanded and encoded bitstream 712 can be delivered to the device using a streaming protocol, such as HTTP live streaming (HLS), or some other streaming protocol.

In another implementation, which is illustrated by a dashed path 718, the UGC 702 can be input directly to the de_banding_net 706. That is, in such an implementation, the example 700 may not include the banding_net 704 and the test 705. To reiterate, one implementation of the example 700 can include a path illustrated by the dotted arrows and another implementation of the example 700 can include a path illustrated by the dashed line.

Figure 7B:
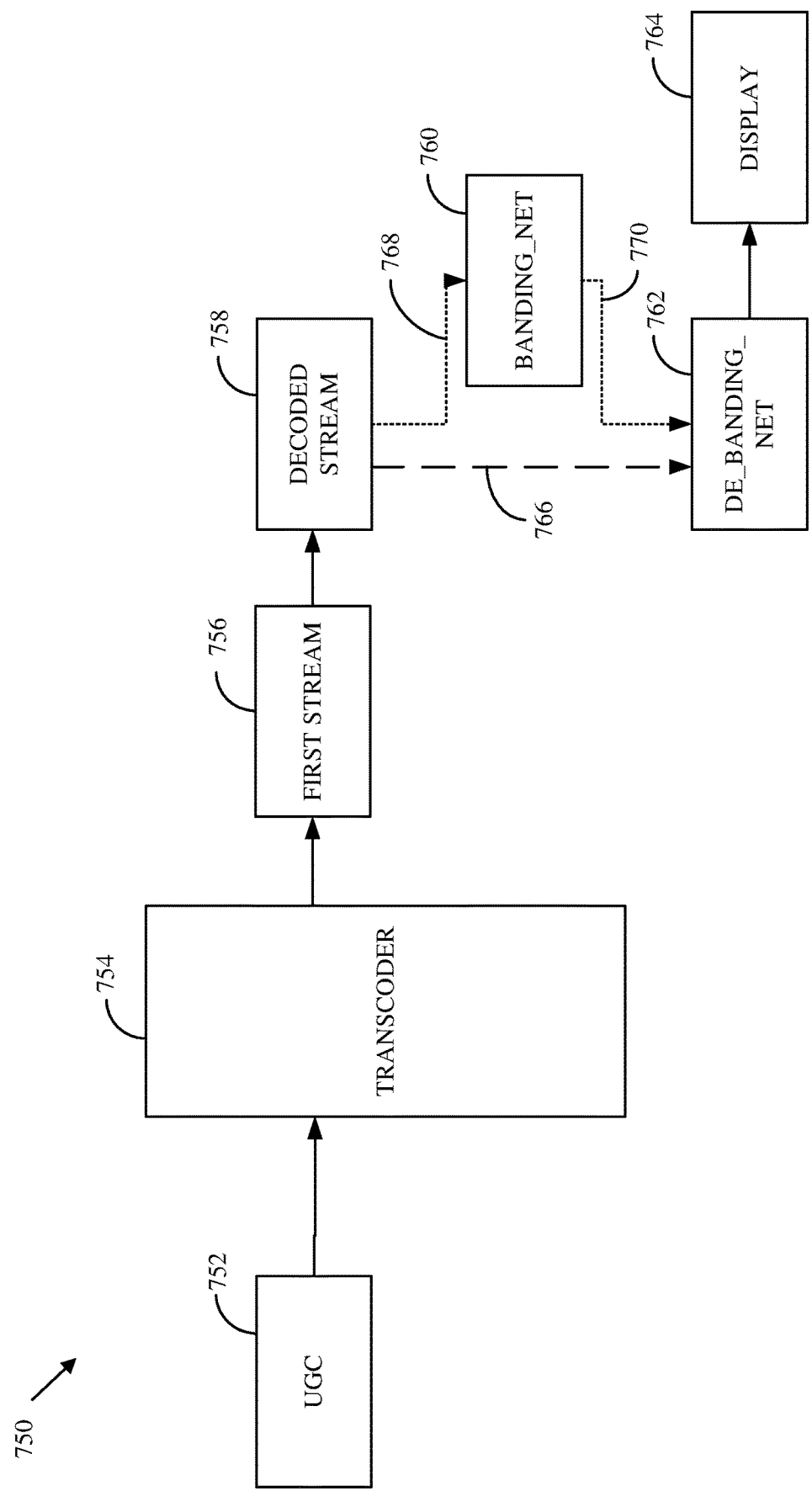
FIG. 7B is an example of using a trained debanding model in a post-processing scenario according to implementations of this disclosure.

FIG. 7B is an example 750 of using trained debanding model in a post-processing scenario according to implementations of this disclosure. Similarly to as described with respect to FIG. 7A, some first implementations of the example 750 can include a first path that is illustrated by a dashed line 766; and other second implementation of the example 750 can include a second path that is illustrated by dotted lines 768, 770. In the first implementations, only a DeBandingNet is used at a client device. In the second implementation, both a BandingNet and a DeBandingNet are used at the client device.

In the example 750, a de_banding_net 762 can be used, such as at the client device, to deband a received compressed bitstream (i.e., at least some of the frames therein). In some examples the compressed bitstream can be streamed to the device using a streaming protocol (e.g., HLS). The de_banding_net 762 can perform debanding on one or more frames of the received compressed bitstream. In an example, the de_banding_net 762 can be, or can be part of, a post filtering stage, such as the post filtering stage 514 of FIG. 5.

A UGC 752 can be received by a transcoder 754. The UGC 752 can be as described with respect to the UGC 702 of FIG. 7A. The transcoder 754 outputs one or more versions of the UGC 752, including a first stream 756. The first stream 756 can be received at the device, such as the receiving station 106 of FIG. 1 or a client device that can be as described with respect to the computing device 200 of FIG. 2. The first stream 756 can be the compressed bitstream 420 of FIG. 5. At the device, the first stream 756 is decoded to produce a decoded stream 758.

In the first implementations of the example 750, the de_banding_net 762 can generate a debanded frame for a frame of the decoded stream 758. The debanded frames can then be displayed at a display 764 of the device, such as the display 218 of FIG. 2

In the second implementation of the example 750, a banding_net 760 (i.e., a trained BandingNet) can determine respective banding scores for at least some of the decoded frames of the decoded stream 758. While not specifically shown in FIG. 7B, a test, such as the test 705 of FIG. 7A, can determine whether the banding score of a decoded frame exceeds a banding threshold. If so, the decoded frame can be input to the de_banding_net 762 to produce the debanded frame to be displayed at the display 764; if not, then the frame is not input to the de_banding_net 762.

Figure 8:
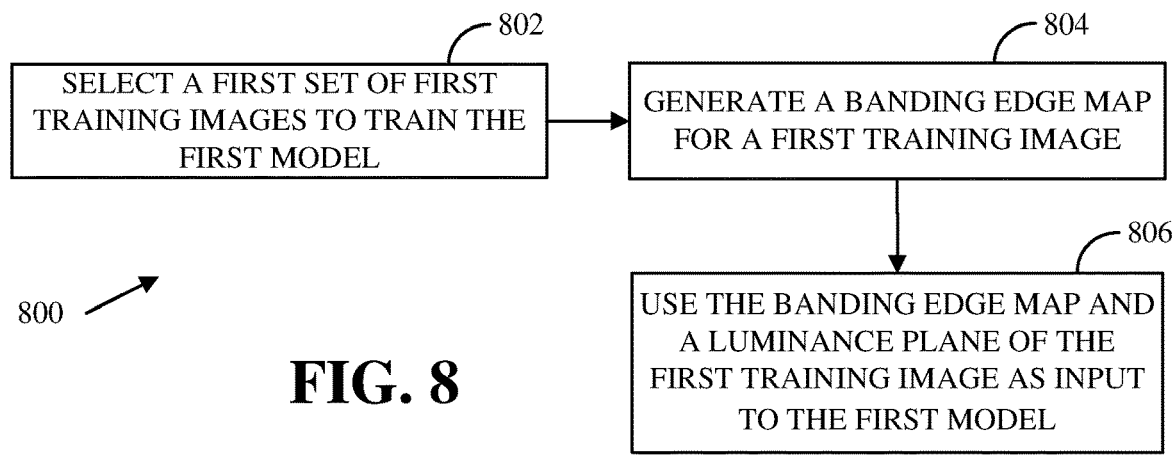
FIG. 8 is a flowchart of an example of a technique for training a BandingNet according to implementations of this disclosure.

FIG. 8 is a flowchart of an example of a technique 800 for training a BandingNet according to implementations of this disclosure. The BandingNet can be a convolutional neural network, as described with respect to FIG. 15. For example, the BandingNet can be a RESidual neural NETwork (ResNet). As mentioned above, the BandingNet (i.e., a first model) is trained to (e.g., configured to, etc.) receive an image as an input and output a banding score for the image. Initially, the parameters (e.g., the weights of the second model) may be randomly generated. A general technique for training and using a neural network, such as the BandingNet, is also described with respect to FIG. 16.

The technique 800 can be implemented, for example, as a software program that may be executed by computing devices such as the computing device 200 of FIG. 2. The software program can include machine-readable instructions that may be stored in a memory such as the memory 204 or the secondary storage 214, and that, when executed by a processor, such as CPU 202, may cause the computing device to perform the technique 800. The technique 800 can be implemented using specialized hardware or firmware. Multiple processors, memories, or both, may be used.

At 802, the technique 800 selects a first set of first training images to train the first model (i.e., the BandingNet). The first training images can be such that the distribution of the ground truth banding scores of the training images of the first training images are balanced.

In an example, the CelebFaces Attributes Dataset (CelebA), or a subset thereof, can be used. CelebA is a large-scale face attributes dataset with more than 200,000 celebrity images. However, other first training images can be used. To ensure that the ground truth banding scores are balanced, images of the dataset can be rescaled to the same size (e.g., 256×256 pixels) with the same aspect ratio, and padded with zeros for the missing pixels. The first set of first training images can be obtained from the rescaled CelebA images by compressing the images using a lossy compression technique, e.g., Graphic Interchange Format (GIF), etc., with palette sizes of 16, 64, 128, and 256 colors.

The ground truth banding scores for each training image of the first set of first training images can be computed using a baseline (e.g., traditional) technique. The banding scores can be calculated in increments (e.g., intervals) of 0.01.

Figure 9:
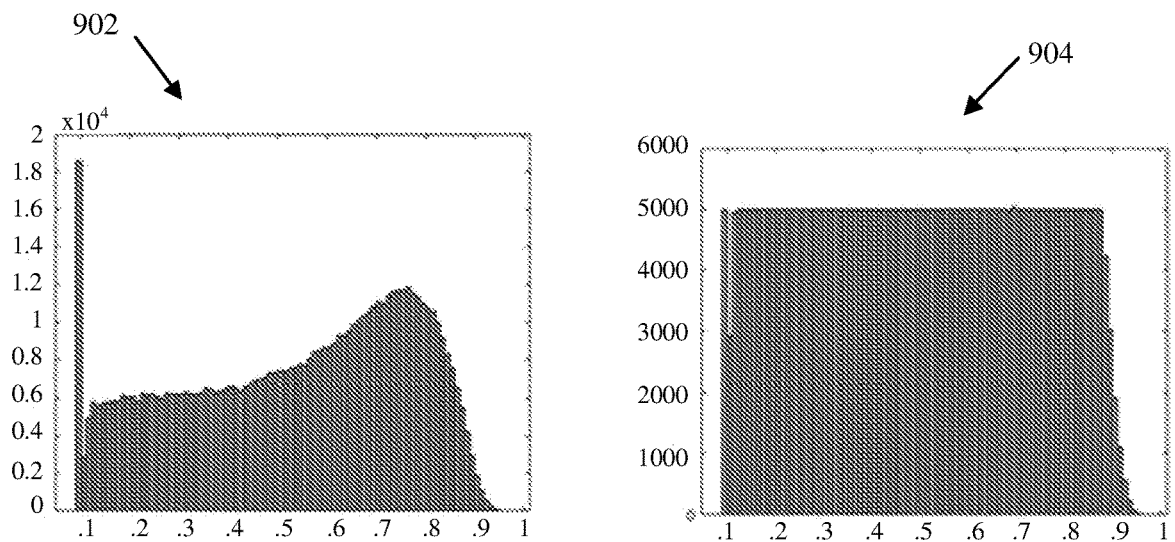
FIG. 9 illustrates banding score distributions of the training images of the first set of first training images.

FIG. 9 illustrates banding score distributions of the training images of the first set of first training images. The X-axis of the graphs of FIG. 9 represents the raw banding Degradation Mean Opinion Score (DMOS), and the Y-axis represents the number of images. A graph 902 of FIG. 9 shows the entire banding score distribution for the first set of first training images.

In an example, a subset (e.g., 400) of the lossy compressed images can be used as the first set of first training images. A graph 904 shows the banding score distribution of the subset after random sampling that is capped at 5000 for all 0.01 intervals.

Returning to FIG. 8, at 804, for a first training image of the first set of the first training images, the technique 800 generates a banding edge map. A respective banding edge map can be generated for each training image of the first set of the first training images. Banding artefacts tend to appear on the boundary between two smooth regions. The banding edge map extracts such potential banding edges and forms an input map for use in the training the BandingNet. The banding edge map includes weights that emphasize banding edges and de-emphasize true edges in the first training image.

Generating the banding edge map can include, as further described with respect to Algorithm I below, computing (e.g., calculating) a gradient map for the luminance plane of the first training image; computing (e.g., calculating) a weight map for the first training image; and obtaining the banding edge map by multiplying the gradient map by the weight map.

The banding edge map can be generated using an algorithm such as Algorithm I.

---

Algorithm I

1    Convert red-green-blue (RGB) data to luma-chroma (YUV) data
2    Compute Gradient $G_x$ and $G_y$ for the Y Channel
3    radient map $G = \sqrt{G_x^2 + G_y^2}$
4    Calculate Weight map $W = ((1 - ReLu(1 - G)) * ones(N \times N))^2$
5    Calculate Banding Edge Map $E = W \cdot G$

---

Algorithm I may receive a RGB image. If so, then at line 1, Algorithm I converts the RGB data to the YUV color space, which includes a luminance (Y) channel and two chrominance (U and V) channels.

At line 2, Algorithm I calculates the horizontal $G_x$ and the vertical $G_y$ gradient components at each pixel location of the luminance channel (i.e., luminance image, luminance component), denoted I. As is known, the gradient measures the amount of change in pixel values at a pixel location. Gradient information can be used to identify the boundaries between areas of the image, which are characterized by significant color changes. The horizontal $G_x$ and the vertical $G_y$ gradient components can be calculated using formulae (1a) and (2a), respectively. However, other ways of calculating the gradients are possible.

$$G_y(x, y) = {I(x, y+1) - I(x, y-1)}/2 \tag{1a}$$

$$G_x(x, y) = {I(x+1, y) - I(x-1, y)}/2 \tag{2a}$$

In formula (1a), $G_y(x, y)$ is the y gradient value for the current pixel having a coordinate of $(x, y)$, and $I(x, y)$ represents the luminance pixel value at a coordinate of $(x, y)$. To compute the y gradient value, the luminance pixel values for the pixel above and the pixel below the current pixel are used. In another example, In formula (2a), $G_x(x, y)$ is the x gradient value for the current pixel having a coordinate of $(x, y)$, and $I(x, y)$ represents the luminance pixel value at a coordinate of $(x, y)$. To compute the x gradient value, the luminance pixel values for the pixel to the left and the pixel to the right the current pixel are used.

In another example, formulae (1b) and (2a) can be used to calculate the horizontal $G_x$ and the vertical $G_y$ gradient components.

$$G_y(x, y) = I(x, y+1) - I(x, y) \tag{2a}$$

$$G_x(x, y) = I(x+1, y) - I(x, y) \tag{2b}$$

At line 3, Algorithm I calculates the Gradient map, G. The gradient map G includes a gradient value for each pixel of the luminance image.

In another example, the Sobel operator can be used to obtain the gradient map. The Sobel operator performs a 2-D spatial gradient measurement on the image. Thus, the Sobel operator can emphasize regions of high spatial frequency corresponding to edges with the corresponding directions in the image block.

At line 4, Algorithm I calculates a weight map, W. The weight map W includes a weight value for each pixel of the luminance image. As such, the weight map includes respective weights for pixels of the first training image. At line 4, the function ReLu(a) is the rectified linear unit that returns a if a≥0; otherwise, it returns 0. Thus, ReLu(1−G(x, y)) is 0 when G(x, y)≥1; and (1−G(x, y)) when G(x, y)<1. The purpose of the Re Lu operation is to remove (e.g., attempt to remove) high contrast pixels (i.e., true edges) so that the remaining edges are those that are mainly caused by compression. That is, the remaining edges are edges that are likely to be artefacts (e.g., banding artefacts).

The weight map, W, is computed using the gradient map, G. The weight map can be obtained by generating a map (e.g., (1−ReLu(1−G)) using the gradient map, where the map excludes high contrast pixels; and convolving, to obtain the weight map, the map with a kernel (e.g., ones(N×N)) having a predefined size (e.g., N×N). In an example, the predefined size can be 7×7. However, other sizes are possible. The kernel ones(N×N) is a 2-dimensional matrix of size N×N where each value of the matrix is 1.

It is noted that the gradient map can include gradient values that are either zero or positive values. The gradient value for a pixel is zero if the pixel is, for example, within a uniform region. For each such pixel (i.e., in a uniform region) at a location $(x, y)$, $(1-ReLu(1-G(x, y)))$ is 0. The gradient value for a pixel is not zero (i.e., $G(x, y)>0$) if the pixel is at or very close to an edge. For each such pixel at a location $(x, y)$, $(1-ReLu(1-G(x, y)))$ is 1.

At line 5, the banding edge map is calculated as the product of the weight map W with the gradient map G.

Returning to FIG. 8, at 806, the technique 800 uses the banding edge Map, E, and the luminance plane Y of the first training image as input (i.e., [E, Y]) to the first model to train the first model. As mentioned, the first model is trained to output a banding score. The difference between the ground truth banding score and the banding score output during training can be used as a loss function, or as part of a loss function, that is used to optimize the parameter values of the BandingNet.

Figure 10:
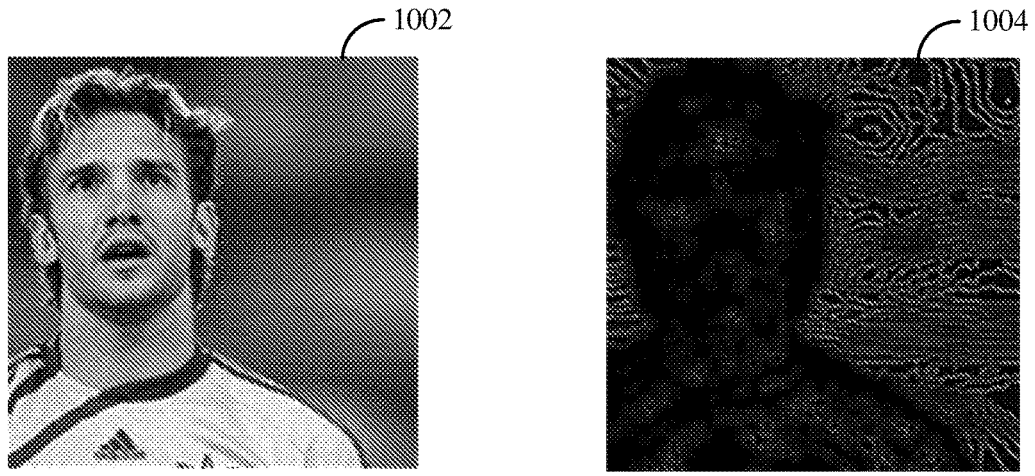
FIG. 10 is an example of a luminance image and a banding edge map according to implementations of this disclosure.

FIG. 10 is an example of a luminance image and a banding edge map according to implementations of this disclosure. A luminance image 1002 can be the first training image. Algorithm I generates a banding edge map that is visually depicted using banding edge map 1004. In the banding edge map 1004, potential banding edges (e.g., banding on the background) are highlighted in the banding edge map E with greater weights than true edges (such as eyes and hairs), which are set with relatively low weights in the banding edge map E.

The BandingNet (i.e., the first model) may be trained using images of size N×N (e.g., 256×256). After training, the BandingNet may be used to output a banding score for images that are bigger or smaller than N×N. In the case of an image that is smaller than N×N, the image can be padded, using any padding technique, so that an image of size N×N is input to the BandingNet. More accurately, and as mentioned above, the luminance channel of the image and a banding edge map calculated according to Algorithm I are input to the BandingNet. In the case that an input image is larger than N×N (e.g., 1024×1024), the image can be split into N×N patches (e.g., 16 patches), and a respective banding score can be output for each patch. The respective banding scores of the patches can be combined to obtain a banding score for the image. Any number of ways of combining the respective banding scores are possible. In an example, the maximum of the respective banding scores can be taken as the banding score of the image. In another example, the mean of the respective banding scores can be used. In yet another example, a percentile (e.g., 95% percentile) of the respective banding scores can be used.

As further described below, the BandingNet (e.g., the first model) can be used in the training of a DeBandingNet (e.g., a second model). The banding score from the BandingNet can be used as part of a loss function in the training of the DeBandingNet. As mentioned above, the second model receives a banded image (i.e., an image that may include banding artefacts) and outputs a debanded image (i.e., an image from which the banding artefacts are removed, or at least significantly reduced).

The second model (i.e., the DeBandingNet) can be trained by steps that include selecting a second set of training images (which may be the same as the first set of the training images); for a second training image of the second training images, generating a training debanded image; generating, using the first model, a training banding score for the training debanded image; generating an image difference between the second training image and the debanded image; and using a weighted combination of the image difference and the training banding score in a loss function that is used to train the second model. In an example, the loss function can be a sum of a second norm (i.e., ||image diff||) of the image difference plus a weight (i.e., w) multiplied the training banding score (i.e., ||banding score||). Thus, the loss function can be loss=||image diff||+w×||banding score||. In another example, the absolute value of the banding score (i.e.,|banding score|) can be used.

Figures 11A, 11B:
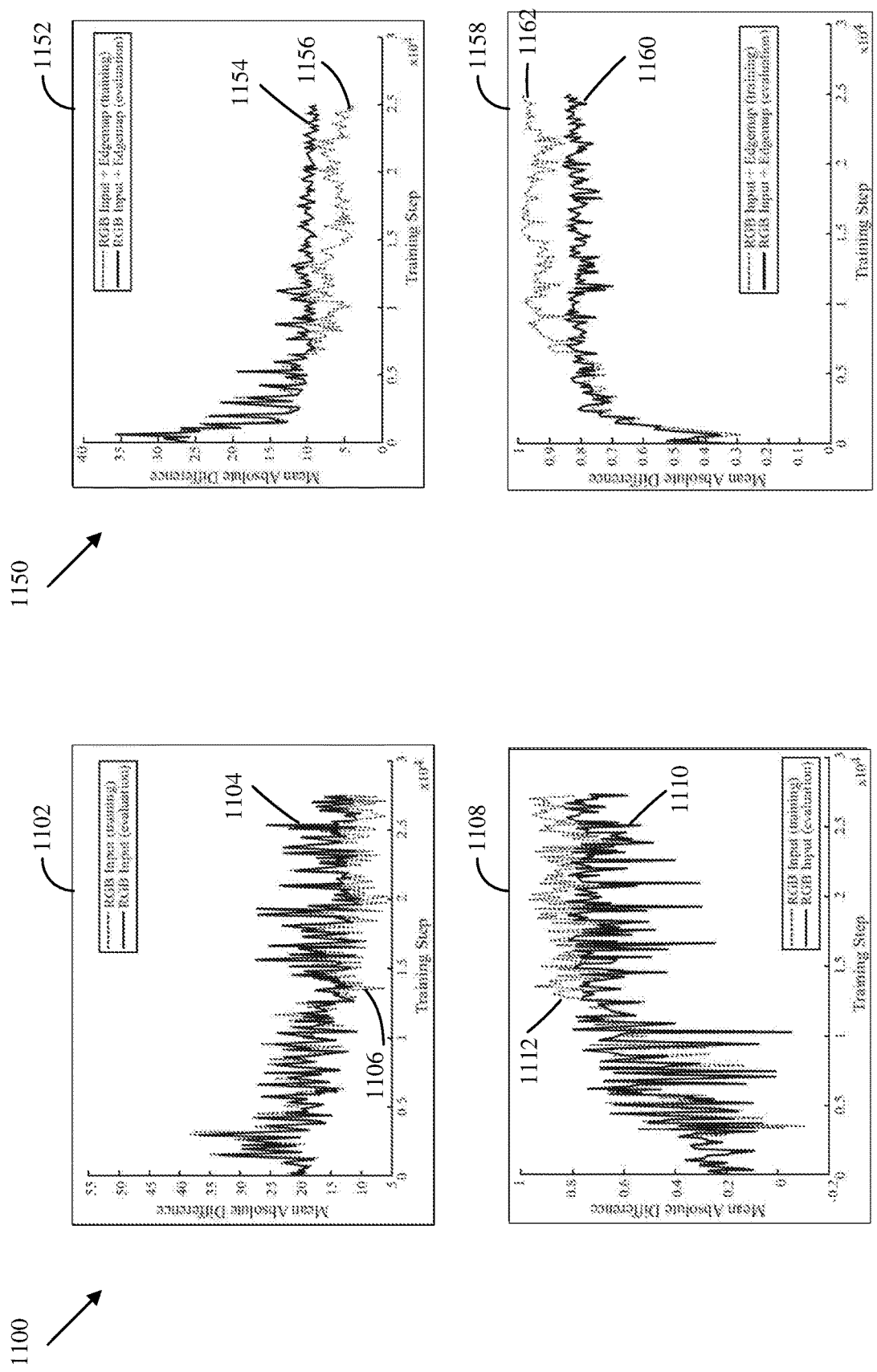
FIGS. 11A-11B are comparative examples of training a BandingNet without and with using a banding edge map.

FIGS. 11A-11B are comparative examples of training the BandingNet (i.e., the first model) without and with using a banding edge map.

FIG. 11A illustrates results 1100 of training a convolution neural network using RGB CelebA images as training data. Mean Square Error (MSE) between a predicted banding score (i.e., the output of the convolution neural network) and a ground truth banding score is used as the loss variable in the optimization function. FIG. 11A illustrates that the training is unstable. The training in this case took a long time to converge (i.e., 20,000 epochs with a batch size of 200).

A graph 1102 illustrates the mean absolute difference (MAD) between the ground truth banding values and the prediction banding values at different steps of the training. The MAD is approximately 13.4 with a range of [0, 100]. The graph 1102 includes a first line 1104 that plots the MAD during training and a second line 1106 that plots the MAD during evaluation (e.g., testing). A graph 1108 illustrates the Pearson correlation for the training data (i.e., a line 1110) and the evaluation data (i.e., a line 1112). The Pearson correlation is 0.72. The Pearson correlation measures the correlation between the ground truth banding score (i.e., as calculated by an undifferentiable banding metric) and the predicted banding score (i.e., the banding score output by the BandingNet).

Contrastingly, using the banding edge map and the luminance plane, as described herein, to train the BandingNet results in faster convergence of the BandingNet and a much higher Pearson correlation (i.e., 0.83). FIG. 11B illustrates results 1150 of training the BandingNet using the banding edge map described herein. A graph 1152 illustrates the mean absolute difference (MAD) between the ground truth banding values and the prediction banding values at different steps of the training. The graph 1152 includes a first line 1154 that plots the MAD during training and a second line 1156 that plots the MAD during evaluation (e.g., testing). A graph 1158 illustrates the Pearson correlation for the training data (i.e., a line 1160) and the evaluation data (i.e., a line 1162). The Person correlation is 0.83.

Figure 12:
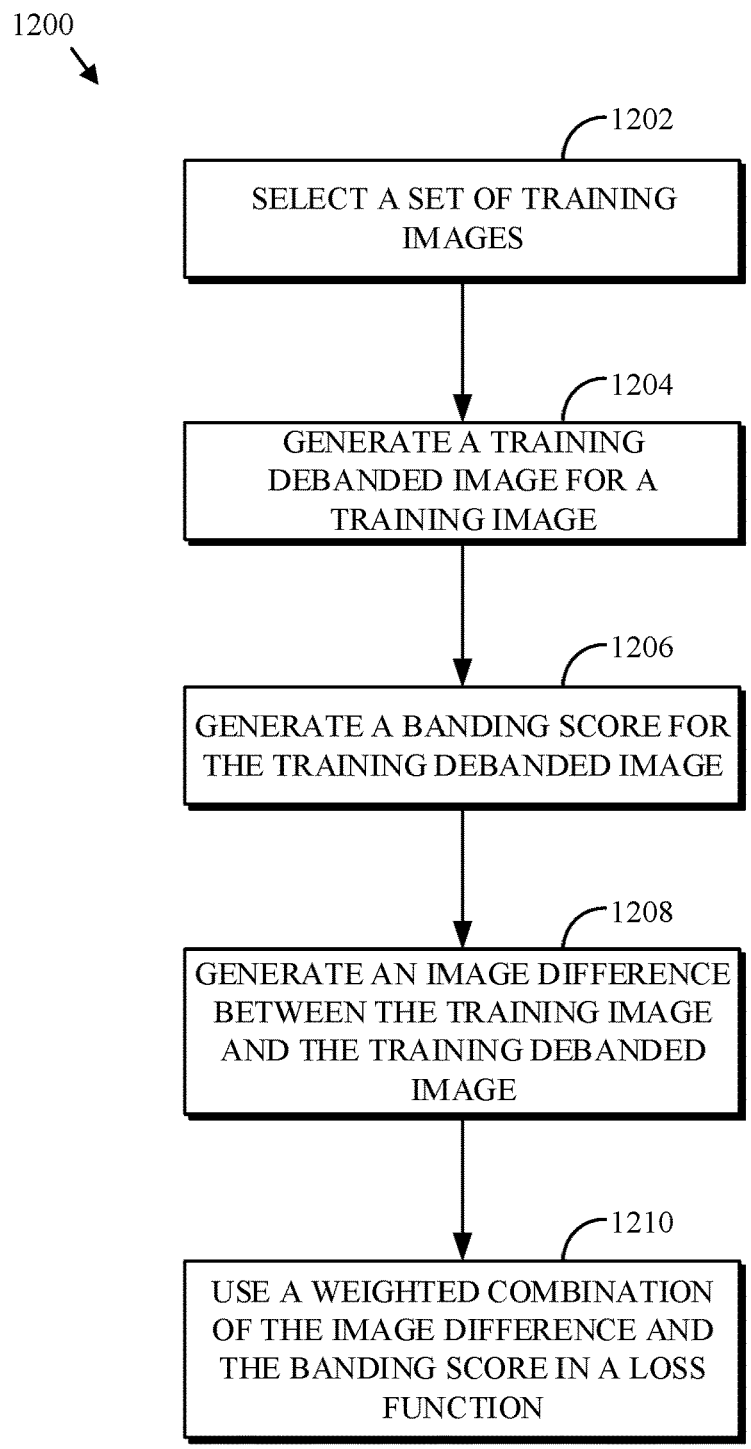
FIG. 12 is a flowchart of an example of a technique for training a DeBandingNet according to implementations of this disclosure.

FIG. 12 is a flowchart of an example of a technique 1200 for training a DeBandingNet (i.e., a second model) according to implementations of this disclosure. After being trained, the DeBandingNet receives a banded image as input and outputs a debanded image. The DeBandingNet can be a convolutional neural network, as described with respect to FIG. 15. Initially, the parameters (e.g., the weights of the second model) may be randomly generated. A general technique for training and using a neural network, such as the DeBandingNet, is also described with respect to FIG. 16.

At 1202, the technique 1200 selects a set of training images (i.e., a second set of second training images). Selecting the set of training images can mean using, accessing, receiving, or selecting in any way possible. At 1204, the technique 1200 generates a training debanded image for a second training image of the second training images. That is, the second model receives, as input, the second training image and outputs the training debanded image. Respective training debanded images can be output for the training images.

At 1206, the technique 1200 generates (e.g., calculates, obtains, etc.) a banding score for the training debanded image. Any technique can be available for calculating the banding score. In an example, the banding score can be computed using the techniques described in Y. Wang, S. Kum, C. Chen and A. Kokaram, "A perceptual visibility metric for banding artifacts," 2016 *IEEE International Conference on Image Processing* (ICIP), Phoenix, Arizona, 2016, pp. 2067-2071. Respective banding scores can be generated for the training debanded images.

At 1208, the technique 1200 generates (e.g., calculates, obtains, etc.) an image difference between the second training image and the training debanded image. The image difference can be calculated in any number of ways. For example, the image difference can be the mean square error between respective (i.e., co-located) pixel values of between the second training image and the training debanded image. The image difference can be a sum of absolute differences error between respective pixel values of the second training image and the training debanded image. In an example, the image difference can be the second (i.e., Euclidean) norm difference. Respective image difference can be generated between the second training images and the corresponding training debanded images.

At 1210, the technique 1200 uses a weighted combination of the image difference and the banding score in a loss function that is used to train the second model. Respective weighted combinations can be obtained for the input images.

In an example, generating the banding score for the training debanded image, can include using a first model to generate the banding score. The first model can be the BandingNet described above. The first model can be trained to output the banding score of the training debanded image as described with respect to FIG. 8. As such, training the first model can include, selecting a first set of first training images to train the first model; generating a banding edge map for a first training image of the first set of the first training images; and using the banding edge map and a luminance plane of the first training image as input to the first model.

Generating the banding edge map can include, as described above with respect to FIG. 8, computing a gradient map for a luminance channel of the first training image; computing a weight map for the first training image; and obtaining the banding edge map by multiplying the gradient map by the weight map. The weight map can include respective weights for pixels of the first training image. The weight map can be computed using the gradient map.

Computing the weight map for the first training image can include, as described above with respect to FIG. 8, generating a map using the gradient map that excludes high contrast pixels; and convolving, to obtain the weight map, the map with a kernel having a predefined size. The predefined size can be equal to 7×7. The kernel can consist of 1 values.

FIG. 13 is a flowchart of an example of a technique 1300 for training a DeBandingNet (i.e., a second model) using a BandingNet (i.e., a first model) according to implementations of this disclosure. After being trained, the DeBandingNet receives a banded image (e.g., an image that may include banding artefacts) as input and outputs a debanded image.

At 1302, the technique 1300 trains the first model. Training the first model can be as described with respect to FIG. 8. Thus, training the first model can include selecting a first set of first training images to train the first model; for a first training image of the first set of the first training images, generating a banding edge map; and using the banding edge map and a luminance plane of the first training image as input to the first model. The banding edge map includes weights that emphasize banding edges and de-emphasize true edges in the first training image.

As described above with respect to FIG. 8, generating the banding edge map can include computing a gradient map for a luminance channel of the first training image; computing a weight map for the first training image; and obtaining the banding edge map by multiplying the gradient map by the weight map. The weight map can include respective weights for pixels of the first training image. The weight map can be computed using the gradient map. Computing the weight map for the first training image can include generating a map using the gradient map, where the map excludes high contrast pixels; and convolving, to obtain the weight map, the map with a kernel having a predefined size. The predefined size can be 7×7. The kernel can consist of 1 values.

At 1304, the technique 1300 trains the second model to deband the image. Training the second model can be as described with respect to FIG. 12. Thus, training the second model can include selecting a second set of second training images to train the second model; for a second training image of the second set of the second training images, generating a debanded training image; generating, using the first model, a banding score for the debanded training image; and using the banding score in a loss function that is used in training the second model.

As described with respect to FIG. 12, training the second model to deband the image can include obtaining an image difference between the debanded training image and the second training image, and using the image difference in the loss function that is used in training the second model. The loss function can be a weighted sum of the image difference and the banding score.

At 1306, after the second model is trained, the technique 1300 generates a debanded image for the image using the second model. That is, the image can be input to the second model and the debanded image is output by the second model.

FIG. 14 is a diagram 1400 that illustrates at least some aspects of the technique of FIG. 13. The diagram 1400 illustrates training the DeBandingNet using the BandingNet. The diagram 1400 includes a DeBandingNet 1404, which is to be trained, and a BandingNet 1408, which is already trained to output a banding score for an input image.

A training input image 1402 is input to the DeBandingNet 1404. The DeBandingNet 1404 outputs a training debanded image 1406. The luminance plane of the training debanded image 1406A and a banding edge map that is calculated as described with respect to Algorithm I are input to the BandingNet 1408, which outputs a banding score 1410 for the training debanded image 1406. An image difference 1414 is also obtained, using an operator 1412, as the difference between the training input image 1402 and the training debanded image 1406. A total loss value 1416, which combines the banding score 1410 and the image difference 1414 can be used to refine the parameters of the DeBandingNet 1404 during the training.

Figure 15:
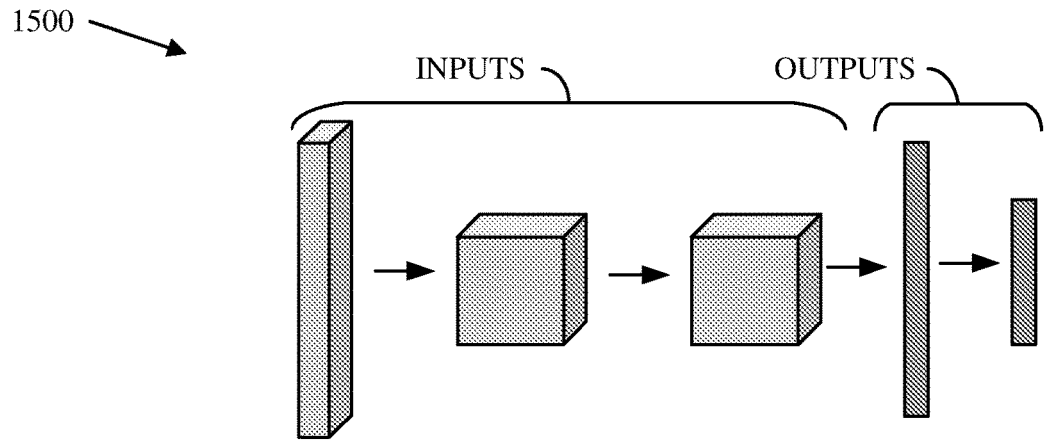
FIG. 15 is a block diagram of an example of a typical convolutional neural network (CNN).

FIG. 15 is a block diagram of an example 1500 of a typical convolutional neural network (CNN). The example 1500 illustrates a high-level block diagram of an example 1500 of a typical CNN network, or simply a CNN. A CNN is an example of a machine-learning model. In a CNN, a feature extraction portion typically includes a set of convolutional operations, which is typically a series of filters that are used to filter an input image based on a filter (typically a square of size k, without loss of generality). For example, and in the context of machine vision, these filters can be used to find features in an input image. The features can include, for example, edges, corners, endpoints, and so on. As the number of stacked convolutional operations increases, later convolutional operations can find higher-level features.

In a CNN, a classification portion is typically a set of fully connected (FC) layers, which may also be referred to as dense operations. The fully connected layers can be thought of as looking at all the input features of an image in order to generate a high-level classifier. Several stages (e.g., a series) of high-level classifiers eventually generate the desired classification output. The classification output can be one or more values that can indicate a banding score of an input image.

As mentioned, a typical CNN network is composed of a number of convolutional operations (e.g., the feature-extraction portion) followed by a number of fully connected layers. The number of operations of each type and their respective sizes is typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation. Additionally, the CNN can include skip connections or shortcuts to jump over some layers from one layer to another.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input image. The operations performed by this layer are typically linear/matrix multiplications. The output of the convolution filter may be further filtered using an activation function. The activation function may be a linear function or non-linear function (e.g., a sigmoid function, an arcTan function, a tanH function, a Rectified Linear unit (ReLu) function, or the like).

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

Some CNN network architectures used to perform analysis of frames and superblocks may include several feature extraction portions that extract features at different granularities (e.g., at different sub-block sizes of a superblock) and a flattening layer (which may be referred to as a concatenation layer) that receives the output(s) of the last convolution layer of each of the extraction portions. The flattening layer aggregates all the features extracted by the different feature extraction portions into one input set. The output of the flattening layer may be fed into (i.e., used as input to) the fully connected layers of the classification portion. As such, the number of parameters of the entire network may be dominated (e.g., defined, set, etc.) by the number of parameters at the interface between the feature extraction portion (i.e., the convolution layers) and the classification portion (i.e., the fully connected layers). That is, the number of parameters of the network is dominated by the parameters of the flattening layer.

Figure 16:
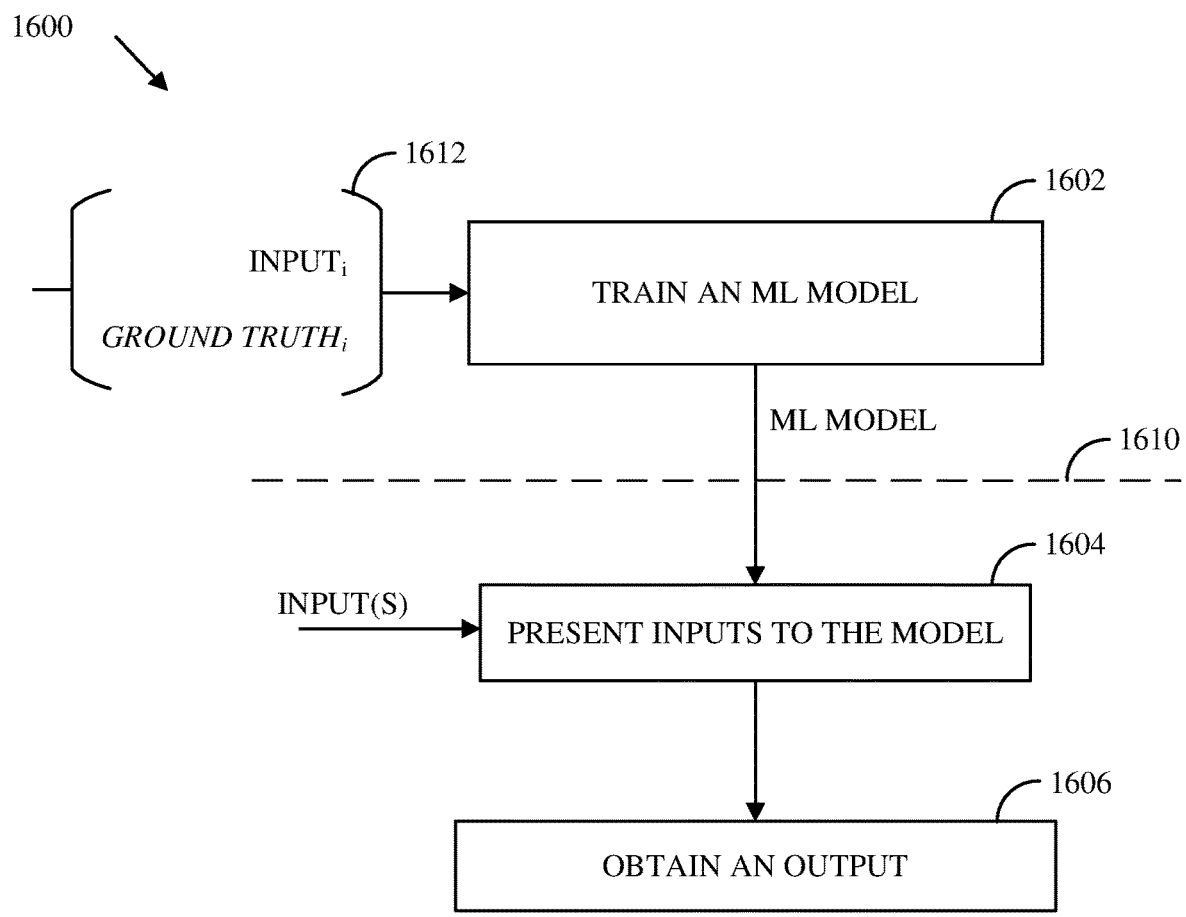
FIG. 16 is an example of a technique for training and using a machine-learning model according to implementations of this disclosure.

FIG. 16 is an example of a technique for training and using a machine-learning model according to implementations of this disclosure. The machine-learning (ML) model can be a CNN, such as the CNN described with respect to FIG. 15.

The process or technique 1600 trains, using input data, the ML model to perform a task. In the case that the ML model is the DeBandingNet, the task to be performed is that of generating a debanded image from an input image that may include banding artefacts. In the case that the ML model is the BandingNet, the task to be performed is that of generating a banding score for an input image. Outputting a banding score can mean outputting a class for the input image, which can be mapped to banding score. The technique 1600 then uses the trained machine-learning model to perform the task.

At 1602, the technique 1600 trains the ML model. The ML model can be trained using training data 1612. Typically, a ground truth is compared to the output of the ML model and the difference between the ground truth and the output can be used to refine the parameters of the ML-model, such as through back propagation.

In the case of the BandingNet, an input datum includes a training image and the ground truth banding score, which may be obtained using a traditional (e.g., a brute force) method. In an example, the traditional method can be an algorithmic method. In an example, the traditional method can be human evaluation. That is, one or more human users can be presented with each input image and the one or more human users can assign banding scores to each input image. In an example, for an input image, the banding scores from multiple users can be averaged to obtain the banding score for the image. The brute force banding score is then compared to the banding score of the BandingNet.

In the case of the DeBandingNet, there is no ground truth associated with a training banded image, per se. Rather, the combination of the banding score, as generated by the BandingNet and the image loss can be used as the loss to be used to refine the parameters of the DeBandingNet.

In the training phase, parameters of the ML model are generated such that, for at least some of the training data, the ML model can infer, for a training datum, a corresponding output.

The ML model can then be used by the technique 1600 during an inference (e.g., operation, etc.) phase. The inference phase includes the operations 1604 and 1606. A separation 1610 indicates that the training phase and the inference phase can be separated in time. As such, the inferencing phase can be performed at one or more first computing devices and the training data 1612 can be performed at one or more second computing devices, which can be different from the one or more first computing devices.

At 1604, inputs are presented to the ML module. For example, the inputs can be presented to a module that incorporates, includes, executes, implements, and the like the ML model. The ML module can be a hardware-implemented module. The ML module can be stored in a memory as executable instructions, which can be executed by a processor. In the case of the DeBandingNet, the input can be an image to be debanded, as described with respect to one of FIGS. 7A-7B. In the case of the BandingNet, in a first example, the image can be as described with respect to FIGS. 7A-7B; and in a second example, the input can be a debanded image, such as the training debanded image 1406 of FIG. 14.

At 1606, the technique 1600 obtains an output from the ML model. In the case of the BandingNet, the output can be a banding score. In the case of the DeBandingNet, the output can be a debanded image.

For simplicity of explanation, the techniques 800, 1200, 1300 and 1600 of FIGS. 8, 12, 13, and 16, respectively, are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, obtaining, or otherwise identifying or determining in any manner whatsoever using one or more of the devices shown in FIG. 1 or FIG. 2.

Further, for simplicity of explanation, although the figures and descriptions herein may include sequences or series of operations or stages, elements of the techniques disclosed herein can occur in various orders and/or concurrently. Additionally, elements of the techniques disclosed herein may occur with other elements not explicitly presented and described herein. Furthermore, one or more elements of the techniques described herein may be omitted from implementations of techniques in accordance with the disclosed subject matter.

The implementations of the transmitting station 102, the receiving station 106 (and the algorithms, techniques, instructions, etc., stored thereon and/or executed thereby), the BandingNet, and/or the DeBandingNet can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of transmitting station 102 and the receiving station 106 do not necessarily have to be implemented in the same manner.

Further, in one implementation, for example, transmitting station 102 and the receiving station 106 can be implemented using a computer program that, when executed, carries out at least some of the respective techniques, algorithms, and/or instructions described herein. In addition or alternatively, for example, a special-purpose computer/processor, which can contain specialized hardware for carrying out any of the techniques, algorithms, or instructions described herein, can be utilized.

The transmitting station 102 and the receiving station 106 can, for example, be implemented on computers in a real-time video system. Alternatively, the transmitting station 102 can be implemented on a server, and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting station 102 and a receiving station 106 implementation schemes are available. For example, the receiving station 106 can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available. The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. A computer apparatus, comprising:
    a memory storing processor readable instructions; and
    a processor arranged to read and execute instructions stored in the memory, wherein the processor readable instructions comprise instructions arranged to control the computer to carry out a method of training a model to deband an image, comprising:
        for a training image of a second set of second training images:
            receiving a training debanded image, the training debanded image comprising image data obtained by removing banding artefacts from the training image;
            generating a banding score for the training debanded image;
            generating an image difference between the training image of the second set of training images and the training debanded image; and
            using a weighted combination of the image difference and the banding score in a loss function that is used to train a second model.

2. The computer apparatus of claim 1, wherein the method further comprises:
    receiving an image comprising banding artefacts; and
    processing the image using the model to remove the banding artefacts.

3. The computer apparatus of claim 1, wherein generating the banding score for the training debanded image comprises processing the training debanded image using a first model to generate the banding score, wherein the first model is trained by, for a first training image of a first set of first training images:
    generating a banding edge map from the first training image, wherein the banding edge map indicates edges caused by banding artefacts in the first training image; and
    using the banding edge map and a luminance plane of the first training image as input to the first model.

4. The computer apparatus of claim 3, wherein the banding edge map comprises weights for each of a plurality of locations of the first training image, the weights emphasizing banding edges and de-emphasizing true edges in the first training image.

5. The computer apparatus of claim 3, wherein generating the banding edge map comprises:
computing a gradient map for a luminance channel of the first training image;
computing a weight map for the first training image, wherein the weight map comprises respective weights for pixels of the first training image, and
wherein the weight map is computed using the gradient map; and
obtaining the banding edge map by multiplying the gradient map by the weight map.

6. The computer apparatus of claim 5, wherein computing the weight map for the first training image comprises:
generating a map using the gradient map, wherein the map excludes high contrast pixels; and
convolving, to obtain the weight map, the map with a kernel having a predefined size.

7. A computer apparatus, comprising:
a memory storing processor readable instructions; and
a processor arranged to read and execute instructions stored in the memory, wherein the processor readable instructions comprise instructions arranged to control the computer to carry out a method of training a model to remove banding artefacts from an image, comprising:
training a first model to measure the banding artefacts, wherein training the first model comprises:
for a training image of a first set of first training images:
generating a banding edge map from the training image, wherein the banding edge map indicates edges caused by banding artefacts in the training image; and
using the banding edge map and a luminance plane of the training image as training input to the first model;
training a second model to deband the image, wherein training the second model comprises, for a second training image of a second set of second training images:
receiving a debanded training image, the debanded training image comprising image data obtained by removing banding artefacts from the training image;
generating, using the first model, a banding score for the debanded training image; and
using the banding score in a loss function that is used in the training the second model; and
outputting the trained second model.

8. The computer apparatus of claim 7, wherein the method further comprises:
receiving an image comprising banding artefacts; and
processing the image using the trained second model to remove the banding artefacts.

9. The computer apparatus of claim 7, wherein training the second model to deband the image comprising:
obtaining an image difference between the debanded training image and the second training image; and
using the image difference in the loss function that is used in the training the second model.

10. The computer apparatus of claim 9, wherein the loss function is a weighted sum of the image difference and the banding score.

11. The computer apparatus of claim 7, wherein generating the banding edge map comprises:
computing a gradient map for a luminance channel of the first training image;
computing a weight map for the first training image, wherein the weight map comprises respective weights for pixels of the first training image, and the weight map is computed using the gradient map; and
obtaining the banding edge map by multiplying the gradient map by the weight map.

12. The computer apparatus of claim 11, wherein computing the weight map for the first training image comprises:
generating a map using the gradient map, wherein the map excludes high contrast pixels; and
convolving, to obtain the weight map, the map with a kernel having a predefined size.

13. The computer apparatus of claim 12, where the predefined size is equal to 7×7.

14. The computer apparatus of claim 12, wherein all weights of the kernel are equal to 1.

15. A computer apparatus, comprising:
a memory storing processor readable instructions; and
a processor arranged to read and execute instructions stored in the memory, wherein the processor readable instructions comprise instructions arranged to control the computer to carry out a method of training a first model to measure a banding score of an image, comprising:
for a first training image of a first set of first training images:
generating a banding edge map, wherein the banding edge map indicates edges caused by banding artefacts in the training image; and
using the banding edge map and a luminance plane of the first training image as training input to the first model.

16. The computer apparatus of claim 15, wherein generating the banding edge map comprises:
computing a gradient map for the luminance plane of the first training image;
computing a weight map for the first training image, wherein the weight map comprises respective weights for pixels of the first training image, and the weight map is computed using the gradient map; and
obtaining the banding edge map by multiplying the gradient map by the weight map.

17. The computer apparatus of claim 16, wherein computing the weight map for the first training image comprises:
generating a map using the gradient map to exclude high contrast pixels; and
convolving, to obtain the weight map, the map with a kernel having a predefined size.

18. The computer apparatus of claim 17, wherein the kernel consists of 1 values.

19. The computer apparatus of claim 15,
wherein the first model is used to train a second model,
wherein the second model receives a banded image as an input and outputs a debanded image, and
wherein the second model being trained by steps to:
select a second set of training images;
for a second training image of the second training images, generate a training debanded image;
generate, using the first model, a training banding score for the training debanded image;
generate an image difference between the second training image and the debanded image; and
use a weighted combination of the image difference and the training banding score in a loss function that is used to train the second model.

20. The computer apparatus of claim 19, wherein the loss function being a sum of a second norm of the image difference plus a weight multiplied by a second norm of the training banding score.

\* \* \* \* \*